United States Patent Office 2,789,117
Patented Apr. 16, 1957

2,789,117

Δ¹,⁴-3,20-11-OXYGENATED-17,21-DIHYDROXY-PREGNADIENE 21-PHOSPHATES AND 9-FLUORO DERIVATIVES THEREOF

Lewis H. Sarett, Princeton, N. J., assignor to Merck & Co., Inc., Rahway, N. J., a corporation of New Jersey No Drawing. Application January 14, 1955,
Serial No. 481,957

11 Claims. (Cl. 260—397.45)

This invention is concerned generally with novel steroid esters and processes of preparing the same. More particularly, it relates to phosphate derivatives of Δ¹,⁴-3,11,20-triketo-17α,21-dihydroxy-pregnadiene and closely related compounds, to processes for preparing these Δ¹,⁴-3,20-diketo-11-oxygenated-17,21-dihydroxy-pregnadiene phosphate compounds, and to pharmaceutical compositions containing them. These novel Δ¹,⁴-3,20-diketo-11-oxygenated - 17,21-dihydroxy-pregnadiene phosphate compounds possess cortisone-activity, but differ from cortisone and hydrocortisone in not possessing sodium or water retention action; they are further characterized as being readily soluble in water. Thus, these novel Δ¹,⁴-3,20-diketo-11-oxygenated-17,21-dihydroxy-pregnadiene phosphate compounds are particularly adapted for the rapid alleviation of arthritis and related diseases by administration in aqueous solution, whereby the hormones are almost instantaneously utilized by the system and, at the same time avoiding the production of undesired metabolic effects such as edema.

These novel Δ¹,⁴-3,20-diketo-11-oxygenated-17,21-dihydroxy-pregnadiene phosphate compounds, subject of the present invention, may be chemically represented as follows:

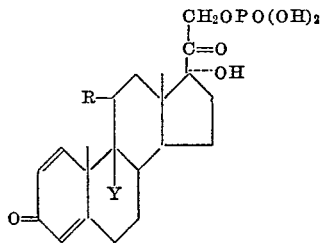

wherein R is a keto or hydroxy radical, and Y is a hydrogen or halogen substituent.

These novel Δ¹,⁴-3,20-diketo-11-oxygenated-17,21-dihydroxy-pregnadiene 21-phosphate compounds may be prepared starting with the corresponding saturated 3,20-diketo-11-oxygenated - 17,21 - dihydroxy - pregnane compound of the allo-series containing a free 21-alcohol grouping. These saturated 3,20-diketo-11-oxygenated-17, 21-dihydroxy-allopregnane compounds may be chemically represented as follows:

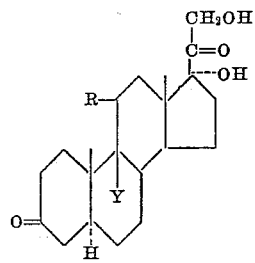

wherein R and Y have the significance above-defined.

This 3,20 - diketo-11-oxygenated-17,21-dihydroxy-allopregnane 21-free alcohol compound is reacted with an alkylene glycol or a compound capable of yielding an alkylene-dioxy radical in an exchange reaction to produce the corresponding 3-cyclic alkylene ketal of the 3,20-diketo-11-oxygenated - 17,21 - dihydroxy-allopregnane 21-free alcohol compound, reacting the latter compound with an organic sulfonyl halide compound thereby forming the corresponding 3,20-diketo-11-oxygenated-17,21-dihydroxy-allopregnane 3-cyclic alkylene ketal 21-organic sulfonate compound, and reacting said 3,20-diketo-11-oxygenated-17,20-dihydroxy-allopregnane 3-cyclic alkylene ketal 21-organic sulfonate compound with an iodide salt to form the corresponding 21-iodo derivative which, when reacted with an organic phosphate, forms the corresponding 3,20 - diketo-11-oxygenated-17,20-dihydroxy-allopregnane 3-cyclic alkylene ketal 21-organic phosphate compound. This latter compound is reacted with hydrogen in the presence of a hydrogenation catalyst and a tertiary amine to form the corresponding amine salt of the 3,20-diketo-11-oxygenated-17,21-dihydroxy-allopregnane 3-cyclic alkylene ketal 21-phosphate compound, which is hydrolyzed under acidic conditions to produce the corresponding 3,20-diketo-11-oxygenated-17,21-dihydroxy-allopregnane 21-phosphate compound. This 3,20-diketo-11-oxygenated-17,21-dihydroxy - allopregnane 21-phosphate compound is reacted with bromine in glacial acetic acid thereby forming the corresponding 2,4-dibromo-3,20-diketo-11-oxygenated-17,21-dihydroxy - allopregnane 21-phosphate compound which, upon reaction with a dehydrohalogenating agent, is converted to corresponding Δ¹,⁴-3,20 - diketo-11-oxygenated - 17,21-dihydroxy-pregnadiene 21-phosphate compound. The latter compound is converted to a salt of said Δ¹,⁴-13,20-diketo-11-oxygenated-17,21-dihydroxy-pregnadiene 21-phosphate compound by treatment with a basic substance.

The 3,20-diketo - 11 - oxygenated-17,21-dihydroxy-allopregnane compounds having a free 21-alcohol grouping which are ordinarily employed as starting material in the hereinabove-mentioned procedure include 3,11,20-triketo-17α,21-dihydroxy-allopregnane; 3,20 - diketo-11β,17α,21-trihydroxy-allopregnane; 9-halo-3,11,20-triketo-17,21-dihydroxy - allopregnanes, as 9α - fluoro-3,11-20-triketo-17α,21-dihydroxy-allopregnane 9α-chloro-3,11,20-triketo-17α,21 - dihydroxy - allopregnane 9 - halo - 3,20-diketo-11β,17α,21-trihydroxy-allopregnanes such as 9α-fluoro-3,20-diketo-11β,17α,21-trihydroxy-allopregnane and the like. The reaction between these 3,20-diketo-11-oxygenated-17,21-dihydroxy-allopregnane 21-free alcohol compounds and an alkylene glycol such as ethylene glycol is conducted in the presence of an acid catalyst, preferably in the presence of an inert solvent such as benezene, toluene, tetrahydrofuran or dioxane. Alternatively, the 3,20-diketo - 11-oxygenated-17,21-dihydroxy-allopregnane 21-free alcohol compound is brought into contact with an alkylene dioxy derivative of a lower aliphatic ketone as for example the ethylene-dioxy derivative of acetone, the ethylene-dioxy derivative of methyl ethyl ketone, the ethylenedioxy derivative of mesityl oxide, and the like, in the presence of an acid catalyst, and an inert solvent. The formation of the 3-alkylene cyclic ketal proceeds rapidly at elevated temperatures, the reaction being complete in one to 5 hours to reflux temperature. As the acid catalyst, it is preferred to use a small amount of a strong acid such as p-toluene sulfonic acid or sulfuric acid. Following completion of the reaction, the acid is neutralized with a base, the mixture is diluted with water, and the desired product is extracted from the mixture with a water-immiscible organic solvent such as chloroform. The product may be isolated by removing the solvent by evaporation in vacuo. In accordance with this procedure there are obtained 3-cyclic alkylene ketal of the 3,20- diketo-11-oxygenated-17,21-dihydroxy-allopregnane 21-free alcohol compounds, such as 3,11,20-triketo-17α,21-dihydroxy-allopregnane 3-ethylene cyclic ketal, 3,20-diketo-11β,17α,21-trihydroxy-allopregnane 3-ethylene cyclic ketal, 9α-fluoro-3,11,20-triketo-17α,21-dihydroxy-allopregnane 3-ethylene cyclic ketal, 9α-fluoro-3,20-diketo-11β,17α,21-trihydroxy-allopregnane 3-ethylene cyclic ketal, and the like.

The reaction between the 3-alkylene cyclic ketal of the 3,20-diketo-11-oxygenated-17,21-dihydroxy-allopregnane 21-free alcohol compounds and the organic sulfonyl chloride is ordinarily carried out in a solvent comprising a tertiary amine such as pyridine. The organic sulfonyl chloride is ordinarily a lower hydrocarbon sulfonyl chloride, preferably a lower alkane sulfonyl chloride such as methane sulfonyl chloride, ethane sulfonyl chloride, and the like. The reaction is usually complete in about one to three hours when the temperature is maintained at 0° C. The 3-alkylene cyclic ketal 3,20-diketo-11-oxygenated-17,21-dihydroxy-allopregnane 21-organic sulfonate compound thus obtained is conveniently recovered from the reaction mixture by diluting it with water, and recovering the crystalline material which precipitates. The 3,20-diketo-11-oxygenated-17,21-dihydroxy-allopregnane 3-alkylene cyclic ketal 21-organic sulfonate compounds obtained utilizing the foregoing method include 3,11,20-triketo-17α,21-dihydroxy-allopregnane 3-ethylene cyclic ketal 21-methane sulfonate, 3,20-diketo-11β,17α,21-trihydroxy-allopregnane 3-ethylene cyclic ketal 21-methane sulfonate, 9α-fluoro-3,11,20-triketo-17α,21-dihydroxy-allopregnane 3-ethylene cyclic ketal 21-methane sulfonate, 9α-fluoro-3,20-diketo-11β,17α,21-trihydroxy-allopregnane 3-ethylene cyclic ketal 21-methane sulfonate, and the like.

The 3,20-diketo-11-oxygenated-17,21-dihydroxy-allopregnane 3-alkylene cyclic ketal 21-organic sulfonate compound is converted to the corresponding iodo compound by treatment with an iodide salt. The reaction is conveniently carried out by bringing the reactants together in a solvent such as an alcohol, ketone, ether, and the like. Typical examples of such solvents include methanol, ethanol, propanol, methyl butyl ether, ethyl ether, acetone and methyl ethyl ketone. The reaction is preferably carried out at a temperature within the range of 25° C. to 100° C. and is usually complete in one-half to two hours. The product is conveniently separated from the reaction mixture by the addition of a non-solvent such as water thereby precipitating the desired 21-iodo-3,20-diketo-11-oxygenated-17-hydroxy-allopregnane 3-alkylene cyclic ketal compound as for example 21-iodo-3,11,20-triketo-17α-hydroxy-allopregnane 3-ethylene cyclic ketal, 21-iodo-3,20-diketo-11β,17α-dihydroxy-allopregnane 3-ethylene cyclic ketal, 9α-fluoro-21-iodo-3,11,20-triketo-17α-hydroxy-allopregnane 3-ethylene cyclic ketal, 9α-fluoro-21-iodo-3,20-diketo-11β,17α-dihydroxy-allopregnane 3-ethylene cyclic ketal, and the like.

The 21-iodo-3,20-diketo-11-oxygenated-17-hydroxy-allopregnane 3-alkylene cyclic ketal compound is converted to the corresponding 21-organic phosphate compound by treating with an organic phosphate preferably a bis-aralkyl ortho-phosphate such as dibenzyl ortho-phosphate, and the like. The reaction is conveniently carried out by bringing together, in an organic solvent for the reactants such as benzene, toluene, xylene or dioxane, a salt of the bis-aralkyl ortho-phosphate and the 21-iodo-3,20-diketo-11-oxygenated-17-hydroxy-allopregnane 3-alkylene cyclic ketal. As the salt of the organic phosphate, it is preferred to use a salt, the cation of which forms insoluble iodides in the organic solvent employed for the reaction, such as silver dibenzyl ortho-phosphate, sodium dibenzyl ortho-phosphate, potassium dibenzyl ortho-phosphate, barium dibenzyl ortho-phosphate, calcium dibenzyl ortho-phosphate, and the like. The reaction is conveniently carried out at the reflux temperature of the solvent, under which conditions reaction is ordinarily complete in about 4 to 26 hours. The reaction mixture is ordinarily filtered thereby removing the insoluble iodide, and the filtered solution is then evaporated in vacuo to small volume. Upon dilution with a non-solvent such as petroleum ether there is obtained the desired 21-organic phosphate compound in the form of a crystalline precipitate which may be recovered by filtration. The 3,20-diketo-11-oxygenated-17,21-dihydroxy-allopregnane 3-alkylene cyclic ketal 21-bis-aralkyl-phosphate compounds obtained in accordance with this procedure include 3,11,20-triketo-17α,21-dihydroxy-allopregnane 3-ethylene cyclic ketal 21-dibenzyl-phosphate, 3,20-diketo-11β,17α,21-trihydroxy-allopregnane 3-ethylene cyclic ketal 21-dibenzyl-phosphate, 9α-fluoro-3,11,20-triketo-17α,21-dihydroxy-allopregnane 3-ethylene cyclic ketal 21-dibenzyl-phosphate, 9α-fluoro-3,20-diketo-11β,17α,21-trihydroxy-allopregnane 3-ethylene cyclic ketal 21-dibenzylphosphate, and the like.

The 3,20-diketo-11-oxygenated-17,21-dihydroxy-allopregnane 3-alkylene cyclic ketal 21-bis-aralkyl-phosphate compounds are converted to the corresponding 3,20-diketo-11-oxygenated-17,21-dihydroxy-allopregnane 3-alkylene cyclic ketal 21-phosphate compound (in the form of the tertiary amine salt) by treating the 21-bis-aralkyl-phosphate compound with hydrogen in the presence of a hydrogenation catalyst and an excess of a tertiary amine such as N-methyl-morpholine, N-methyl-piperidine, dimethylaniline, diethylaniline, trimethylamine, and the like. As the hydrogenation catalyst, it is ordinarily preferred to employ platinum, nickel, palladium, and oxides of these metals which may be supported, if desired, on a carrier such as barium sulfate, calcium carbonate, barium carbonate, and the like. The hydrogenation reaction is ordinarily conducted in a solvent such as an alcohol, for example, ethanol, methanol or propanol. The reaction is carried out at a temperature within the range of 0° C. to 100° C., preferably at room temperature, until two mols of hydrogen are taken up. The hydrogenation product is recovered by diluting the reaction mixture with water, filtering and extracting with a solvent to remove impurities, and evaporating the aqueous solution to dryness, thereby giving the desired 3,20-diketo-11-oxygenated-17,21-dihydroxy-allopregnane 3-alkylene cyclic ketal 21-phosphate compound in the form of its tertiary amine salt, as for example the N-methyl-morpholine salt of 3,11,20-triketo-17α,21-dihydroxy-allopregnane 3-ethylene cyclic ketal 21-phosphate, the N-methyl-piperidine salt of 3,20-diketo-11β,17α,21-trihydroxy-allopregnane 3-ethylene cyclic ketal 21-phosphate, the N-methyl-morpholine salt of 9α-fluoro-3,20-diketo-11β,17α,21-trihydroxy-allopregnane 3-ethylene cyclic ketal 21-phosphate, the dimethylaniline salt of 9α-fluoro-3,11,20-triketo-17α,21-dihydroxy-allopregnane 3-ethylene cyclic ketal 21-phosphate, and the like.

The 3-alkylene cyclic ketal group of the tertiary amine salt of the 3,20-diketo-11-oxygenated-17,21-dihydroxy-allopregnane 3-alkylene cyclic ketal 21-phosphate compound is hydrolyzed to form the corresponding allopregnane 3,20-diketo-11-oxygenated 17,21-dihydroxy-allopregnane 21-phosphate compound by treatment with a strong acid in an organic solvent solution. The strong acids which are ordinarily employed include hydrochloric acid, sulfuric acid, perchloric acid and p-toluene sulfonic acid, preferably in dilute concentrations. The solvent utilized is conveniently a ketone such as acetone, an alkanol such as methanol or ethanol, or a hydrocarbon solvent such as benzene or toluene. The reaction may be conducted at a temperature between about 20 and 100° C., but is conveniently effected at reflux temperature, under which conditions the reaction is ordinarily complete in less than one hour. A preferred procedure for this hydrolysis reaction is to contact a solvent solution of the amine salt with a strongly basic ion-exchange resin of the type disclosed in U. S. Patents 2,597,494; 2,597,440; 2,570,822; 2,567,836 and 2,543,666. The product is recovered from the hydrolysis mixture obtained in accordance with either of these methods by evaporating the solvent from the hydrolyzed solution thereby giving the corresponding 3,20-diketo-11-oxygenated-17,21-dihydroxy-allopregnane 21-phosphate compound such as 3,11,20-triketo-17α,21-dihydroxy-allopregnane 21-phosphate, 3,20-diketo - 11β,17α,21 - trihydroxy-allopregnane 21-phosphate, 9α-fluoro-3,11,20-triketo-17α, 21-dihydroxy-allopregnane 21-phosphate, 9α-fluoro-3,20-diketo-11β,17α,21-trihydroxy-allopregnane 21-phosphate, and the like.

The 3,20 - diketo - 11 - oxygenated - 17,21 - dihydroxy-allopregnane 21-phosphate compound is reacted with bromine to form the corresponding 2,4-dibromo derivative. This reaction is conveniently conducted by bringing the reactants together in an inert organic solvent under substantially anhydrous conditions in the presence of an acidic catalyst. It is ordinarily preferred to utilize a lower alkanoic acid such as glacial acetic acid containing a catalytic amount of a mineral acid such as hydrobromic acid. The rection is conveniently carried out at room temperature under which conditions reaction is ordinarily complete in about 10–15 minutes. The product is conveniently recovered by diluting the reaction mixture with ice water and extracting the resulting aqueous mixture with chloroform. The chloroform extracts are combined, washed with a dilute aqueous alkaline solution, then with water, dried and evaporated to dryness in vacuo to produce the 2,4-dibromo-3,20-diketo-11-oxygenated-17,21-dihydroxy-allopregnane 21-phosphate compound. In accordance with this procedure there are obtained 2,4 - dibromo - 3,11,20 - triketo - 17α,21 - dihydroxy-allopregnane 21-phosphate; 2,4-dibromo-3,20-diketo-11β,17α,21-trihydroxy-allopregnane 21-phosphate; 2,4 - dibromo - 9α - fluoro - 3,11,20 - triketo - 17α,21-dihydroxy-allopregnane 21-phosphate; 2,4-dibromo-9α-fluoro - 3,20 - diketo - 11β,17α,21 - trihydroxy-allopregnane 21-phosphate, and the like.

The 2,4 - dibromo - 3,20 - diketo - 11 - oxygenated-17,21-dihydroxy-allopregnane 21-phosphate compound is heated under reflux with a tertiary amine, preferably collidine, thereby forming the corresponding $\Delta^{1,4}$-3,20-diketo-11-oxygenated-17,21-dihydroxy-pregnadiene 21-phosphate compound. The reaction is conveniently conducted by heating the reactants together under reflux for a period of about one hour at the end of which time the reaction mixture is cooled and poured into ice water. The aqueous reaction solution is contacted with an excess of a sulfonic-type cation-exchange resin on the hydrogen cycle thereby adsorbing the pyridine from the solution; the residual solution is then contacted with sufficient anion-exchange resin to adsorb bromide ion. The resulting aqueous solution is evaporated to dryness in vacuo to give the desired $\Delta^{1,4}$ - 3,20 - diketo - 11 - oxygenated - 17,21 - dihydroxy-pregnadiene 21-phosphate compound such as $\Delta^{1,4}$-3,11,20 - triketo - 17α,21 - dihydroxy - pregnadiene 21-phosphate, $\Delta^{1,4}$ - 3,20 - diketo - 11β,17α,21 - trihydroxy-pregnadiene 21-phosphate, 9α-fluoro-$\Delta^{1,4}$-3,11,20-triketo-17α,21-dihydroxy-pregnadiene 21-phosphate, 9α-fluoro-$\Delta^{1,4}$-3,20 - diketo - 11β,17α,21 - trihydroxy - pregnadiene 21-phosphate, and the like.

The salts of these $\Delta^{1,4}$-3,20-diketo-11-oxygenated-17,21-dihydroxy-pregnadiene 21-phosphate compounds may be prepared by reacting the $\Delta^{1,4}$-3,20-diketo-11-oxygenated-17,21-dihydroxy - pregnadiene 21 - phosphate compound with an aqueous solution of alkali metal or alkaline earth metal bases or basic salts such as hydroxides, carbonates, bicarbonates or acetates. The product is conveniently recovered by adding to the aqueous solution a water-miscible non-solvent such as acetone to precipitate the salt. In accordance with this procedure there are obtained sodium, calcium, potassium, magnesium, barium, and ammonium salts of the $\Delta^{1,4}$-3,20-diketo-11-oxygenated - 17,21 - dihydroxy - pregnadiene 21 - phosphate compounds which, depending on the relative proportions of the reactants may be either the mono or di salts. Examples of the salts prepared in this way are mono-sodium $\Delta^{1,4}$ - 3,11,20 - triketo - 17α,21 - dihydroxy - pregnadiene 21-phosphate, di-potassium $\Delta^{1,4}$-3,11,20-triketo-17α,21-dihydroxy - pregnadiene 21 - phosphate, mono - sodium $\Delta^{1,4}$ - 3,20 - diketo - 11β,17α,21 - trihydroxy - pregnadiene 21-phosphate, di-calcium $\Delta^{1,4}$-3,20-diketo-11β,17α,21-trihydroxy-pregnadiene 21-phosphate, mono-sodium 9α-fluoro - $\Delta^{1,4}$ - 3,11,20 - triketo - 17α,21 - dihydroxy - pregnadiene 21-phosphate, di-sodium 9α-fluoro-$\Delta^{1,4}$-3,11,20-triketo - 17α,21 - dihydroxy - pregnadiene 21 - phosphate, mono-potassium 9α-fluoro-$\Delta^{1,4}$-3,20-diketo-11β,17α,21-trihydroxy-pregnadiene 21-phosphate, di-sodium 9α-fluoro-$\Delta^{1,4}$ - 3,20 - diketo - 11β,17α,21 - trihydroxy - pregnadiene 21-phosphate, and the like.

The following examples illustrate methods in carrying out the present invention but it is to be understood that these examples are given for purposes of illustration and not of limitation.

*Example 1*

A mixture of 2 parts of 3,11,20-triketo-17α,21-dihydroxy-allopregnane and four parts of the dioxolane of mesityl oxide in 15 parts of dry tetrahydrofuran is treated with 0.13 part of concentrated sulfuric acid and stirred at room temperature for about two hours. The mixture is then cooled to 0° C. and allowed to stand for approximately 16 hours. Pyridine is added to neutralize the acid and the product is precipitated by the addition of petroleum ether. The precipitated material is recovered by filtration and recrystallized from ethanol to give substantially pure 3,11,20-triketo-17α,21-dihydroxy-allopregnane 3-ethylene cyclic ketal.

*Example 2*

A mixture of 3.5 parts of 3,11,20-triketo-17α,21-dihydroxy-allopregnane 3-ethylene cyclic ketal in 24 parts of pyridine is cooled to 0° C. To the cooled mixture is added 14 parts of methane sulfonyl chloride, and the resulting mixture is maintained at 0° C. for three hours. The reaction mixture is then poured into ice water whereupon the product separates as a solid, which is recovered by filtration, dried and recrystallized from acetone to give substantially pure 3,11,20-triketo-17α,21-dihydroxy-allopregnane 3-ethylene cyclic ketal 21-methane sulfonate.

*Example 3*

A mixture of 1.5 parts of 3,11,20-triketo-17α,21-dihydroxy-allopregnane 3-ethylene cyclic ketal 21-methane sulfonate, 1.1 parts of sodium iodide and 140 parts of ethanol are heated under reflux for approximately 30 minutes. The entire reaction mixture is filtered, and the filtered solution is evaporated in vacuo to about 100 parts. To this concentrated solution are added 100 parts of water, and the aqueous mixture thus obtained is evaporated to give approximately 150 parts of an aqueous suspension. This suspension is filtered, and the solid material is washed with water and dried to give 21-iodo-3,11,20-triketo-17α-hydroxy-allopregnane 3-ethylene cyclic ketal.

*Example 4*

Approximately 0.75 part of 21-iodo-3,11,20-triketo-17α-hydroxy-allopregnane 3-ethylene cyclic ketal and 0.6 part of silver di-benzyl phosphate are suspended in 150 parts of benzene, and water is removed by evaporating the mixture to a volume of 75 parts. The resulting, concentrated benzene mixture is heated under reflux for about 16 hours, and filtered while hot to separate the silver iodide from the benzene solution. The filtered benzene solution is evaporated to a heavy syrup, and is then redissolved in a minimum quantity of benzene—about 4 parts. The resulting benzene solution is then diluted with petroleum ether to effect crystallization of the material which is recovered by filtration and dried to give 3,11,20-triketo-17α,21-dihydroxy-allopregnane 3-ethylene cyclic ketal 21-di-benzyl phosphate.

Example 5

A solution of 0.5 part of 3,11,20-triketo-17α,21-dihydroxy-allopregnane 3-ethylene cyclic ketal 21-di-benzyl phosphate in 100 parts of ethanol containing two parts of N-methyl morpholine is hydrogenated at 25° C. at atmospheric pressure in the presence of about 0.5 part of pre-reduced palladium oxide catalyst. When hydrogenation is complete, as determined by the quantity of hydrogen (2 mols) taken up, the reaction mixture is filtered to remove the catalyst and the filtrate, which contains the N methyl morpholine salt of 3,11,20-triketo-17α,21-dihydroxy-allopregnane 3-ethylene cyclic ketal 21-phosphate, is evaporated in vacuo to a syrupy residue. The syrup is dissolved in water, and the aqueous solution is washed with ethyl acetate and ether to remove impurities insoluble in these organic solvents. The aqueous solution is then evaporated to dryness to give the N methyl morpholine salt of 3,11,20-triketo - 17α,21 - dihydroxy-allopregnane 3-ethylene cyclic ketal 21-phosphate.

This salt is dissolved in acetone containing a small amount of dilute aqueous hydrochloric acid, and the resulting solution is heated under reflux for about 15 minutes. The reaction solution is evaporated in vacuo to give 3,11,20-triketo - 17α,21 - dihydroxy-allopregnane 21-phosphate.

Example 6

Fifty parts of reagent glacial acetic acid are added to a solution of 0.5 part of 3,11,20-triketo-17α,21-dihydroxy-allopregnane 21-phosphate in 5 parts of chloroform. A few drops of a 0.1 N solution of hydrogen bromide in acetic acid is added, and the resulting solution is stirred while adding thereto, dropwise at room temperature, a solution containing two molecular equivalents of bromine (based on the 3,11,20-triketo-17α,21-dihydroxy-allopregnene 21-phosphate) dissolved in two parts of glacial acetic acid. The reaction solution is evaporated to dryness in vacuo, and the residual material is triturated with low-boiling petroleum ether, and the insoluble material is recovered and dried to give approximately 0.4 part of 2,4-dibromo-3,11,20-triketo - 17α,21 - dihydroxy-allopregnane 21-phosphate.

Example 7

0.5 part of 2,4-dibromo-3,11,20-triketo-17α,21-dihydroxy-allopregnane 21-phosphate is heated under reflux with 10 parts of collidine for one hour; the reaction mixture is concentrated to dryness in vacuo, the residue dissolved in water and the solution then passed through a column containing two hundred parts of a strongly acidic ion-exchange resin. The resultant solution is lyophilized to give $\Delta^{1,4}$-3,11,20-triketo-17α,21-dihydroxy-pregnadiene 21-phosphate.

Example 8

$\Delta^{1,4}$-3,20-diketo-11β,17α,21-trihydroxy-pregnadiene 21-phosphate is prepared utilizing the procedure of Examples 1 to 7, but using 3,20-diketo-11β,17α,21-trihydroxy-allopregnane as the starting material in place of the 3,11,20-triketo-17α,21-dihydroxy-allopregnane utilized in Example 1. The $\Delta^{1,4}$-3,20-diketo-11β,17α,21-trihydroxy - pregnadiene 21-phosphate is treated with an aqueous solution of sodium bicarbonate. The aqueous solution is evaporated to dryness in vacuo and the residual material is dissolved in a minimum quantity of water and extracted with ethyl acetate. The aqueous layer is evaporated to dryness, dissolved in methanol and the methanol solution diluted with a 1:1 mixture of ether-ethanol. The precipitated material is recovered by filtration and dried to give the sodium salt of $\Delta^{1,4}$-3,20-diketo - 11β,17α,21 - trihydroxy-pregnadiene 21-phosphate.

Example 9

9α-fluoro-$\Delta^{1,4}$-3,11,20-triketo-17α,21-dihydroxy - pregnadiene 21-phosphate is prepared utilizing the procedure of Examples 1 to 7 but using 9α-fluoro-3,11,20-triketo-17α,21-dihydroxy-allopregnane as the starting material in place of the 3,11,20-triketo-17α,21-dihydroxy-allopregnane utilized in Example 1. The 9α-fluoro-$\Delta^{1,4}$-3,11,20-triketo-17α,21-dihydroxypregnadiene 21 - phosphate is treated with an aqueous solution of sodium bicarbonate. The aqueous solution is evaporated to dryness in vacuo and the residual material is dissolved in a minimum quantity of water and extracted with ethyl acetate. The aqueous layer is evaporated to dryness, dissolved in methanol and the methanol solution diluted with a 1:1 mixture of ether-ethanol. The precipitated material is recovered by filtration and dried to give the sodium salt of 9α-fluoro-$\Delta^{1,4}$-3,11,20-triketo - 17α,21 - dihydroxypregnadiene 21 - phosphate.

Example 10

9α-fluoro-$\Delta^{1,4}$-3-20-diketo-11β,17α,21 - trihydroxy - pregnadiene 21-phosphate is prepared utilizing the procedure of Examples 1 to 7 but using 9α-fluoro-3,20-diketo-11β, 17α,21-trihydroxy-allopregnane as the starting material in place of the 3,11,20-triketo-17α,21-dihydroxy-allopregnane utilized in Example 1. The 9α-fluoro-$\Delta^{1,4}$-3,20-diketo-11β,17α21-trihydroxy-pregnadiene 21 - phosphate is treated with an aqueous solution of potassium bicarbonate. The aqueous solution is evaporated to dryness in vacuo and the residual material is dissolved in a minimum quantity of water and extracted with ethyl acetate. The aqueous layer is evaporated to dryness, dissolved in methanol and the methanol solution diluted with a 1:1 mixture of ether-ethanol. The precipitated material is recovered by filtration and dried to give the potassium salt of 9 α-fluoro-$\Delta^{1,4}$-3-20-diketo-11β,17α,21-trihydroxy-pregnadiene 21-phosphate.

The 3,11,20-triketo-17α,21-dihydroxy - allopregnane, utilized as starting material in Example 1, may be prepared as follows: 600 mg. of palladium oxide are added to a suspension of 7.25 g. of $\Delta^4$-3,11,20-triketo-17α-hydroxy-21-acetoxy-pregnene in 600 cc. of methanol. The mixture is reacted with hydrogen at a pressure of about 40 pounds per square inch while maintaining the reactants at about room temperature. The absorption of hydrogen ceases after about one-half hour; the amount of hydrogen absorbed corresponds to one mole. The reaction mixture is filtered, thereby removing the catalyst, and the catalyst is washed thoroughly with chloroform. A few drops of ethanolic hydrogen chloride are added to the combined filtrate and washings, and the resulting solution is evaporated to dryness in vacuo. The residual material is dissolved in chloroform, and the solution is again evaporated to dryness. The residual material is then recrystallized twice from acetone to give about 6 grams of substantially pure 3,11,20-triketo-17α-hydroxy-21-acetoxy-allopregnane.

5 grams of 3,11,20-triketo-17α,21-dihydroxy-allopregnane 21-acetate is dissolved in a mixture of 50 cc. of benzene and 50 cc. of 1.1 N methanolic potassium hydroxide, and the solution is allowed to stand at room temperature for a period of about 10 minutes. The solution is then acidified with acetic acid, the benzene is evaporated in vacuo, and the residual material is recrystallized from ethyl acetate to give substantially pure retrocortane 3,11, 20-triketo-17α,21-dihydroxy-allopregnane.

The 3,20-diketo-11β,17α,21-trihydroxy - allopregnane, utilized as starting material in Example 8 hereinabove, may be prepared as follows: 600 mg. of palladium oxide are added to a suspension of 7.25 g. of $\Delta^4$-3,20-diketo11β, 17α-dihydroxy-21-acetoxy-pregnene in 600 cc. of methanol. The mixture is reacted with hydrogen at a pressure of about 40 pounds per square inch while maintaining the reactants at about room temperature. The absorption of hydrogen ceases after about one-half hour; the amount of hydrogen absorbed corresponds to one mole. The reaction mixture is filtered, thereby removing the catalyst, and the catalyst is washed thoroughly with chloroform. A few drops of ethanolic hydrogen chloride are added to the combined filtrate and washings, and the resulting solution is evaporated to dryness in vacuo. The residual material is dissolved in chloroform, and the solution is again evaporated to dryness. The residual material is then recrystallized twice from acetone to give about 6 grams of substantially pure 3,20-diketo-11β,17α-dihydroxy-21-acetoxy-allopregnane.

5 grams of 3,20-diketo-11β,17α,21-trihydroxy-allopregnane 21-acetate are dissolved in a mixture of benzene and 50 cc. of 1.1 N methanolic potassium hydroxide, and the solution is allowed to stand at room temperature for a period of about 10 minutes. The solution is then acidified with acetic acid, the benzene is evaporated in vacuo, and the residual material is recrystallized from ethyl acetate to give substantially pure hydro-retrocortane 3,20-diketo-11β,17α-21-trihydroxy-allopregnane.

The 9α-fluoro-3,11,20-triketo-17α,21-dihydroxy-allopregnane, utilized as starting material in Example 9, may be prepared as follows: 600 mg. of palladium oxide are added to a suspension of 7.25 g. of Δ⁴-9α-fluoro-3,11,20-triketo-17α-hydroxy-21-acetoxy-pregnene in 600 cc. of methanol. The mixture is reacted with hydrogen at a pressure of about 40 pounds per square inch while maintaining the reactants at about room temperature. The absorption of hydrogen ceases after about one-half hour; the amount of hydrogen absorbed corresponds to one mole. The reaction mixture is filtered, thereby removing the catalyst, and the catalyst is washed thoroughly with chloroform. A few drops of ethanolic hydrogen chloride are added to the combined filtrate and washings, and the resulting solution is evaporated to dryness in vacuo. The residual material is dissolved in chloroform, and the solution is again evaporated to dryness. The residual material is then recrystallized twice from acetone to give about 6 grams of substantially pure 9α-fluoro-3,11,20-triketo-17α-hydroxy-21-acetoxy-allopregnane.

5 grams of 9α-fluoro-3,11,20-triketo-17α,21-dihydroxy-allopregnane 21-acetate are dissolved in a mixture of 50 cc. of benzene and 50 cc. of 1.1 N methanolic potassium hydroxide, and the solution is allowed to stand at room temperature for a period of about 10 minutes. The solution is then acidified with acetic acid, the benzene is evaporated in vacuo, and the residual material is recrystallized from ethyl acetate to give substantially pure 9α-fluoro-3,11,20-triketo-17α-21-dihydroxy-allopregnane.

The 9α-fluoro-3,20-diketo-11β,17α,21-trihydroxy-allopregnane, utilized as starting material in Example 10, may be prepared as follows: 600 mg. of palladium oxide are added to a suspension of 7.25 g. of Δ⁴-9α-fluoro-3,20-diketo-11β,17α-dihydroxy-21-acetoxy-pregnene in 600 cc. of methanol. The mixture is reacted with hydrogen at a pressure of about 40 pounds per square inch while maintaining the reactants at about room temperature. The absorption of hydrogen ceases after about one-half hour; the amount of hydrogen absorbed corresponds to one mole. The reaction mixture is filtered, thereby removing the catalyst, and the catalyst is washed thoroughly with chloroform. A few drops of ethanolic hydrogen chloride are added to the combined filtrate and washings, and the resulting solution is evaporated to dryness in vacuo. The residual material is dissolved in chloroform, and the solution is again evaporated to dryness. The residual material is then recrystallized twice from acetone to give about 6 grams of substantially pure 9α-fluoro-3,20-diketo-11β,17α-dihydroxy-21-acetoxy-allopregnane.

5 grams of 9α-fluoro-3,20-diketo-11β,17α,21-trihydroxy-allopregnane 21-acetate are dissolved in a mixture of 50 cc. of benzene and 50 cc. of 1.1 N methanolic potassium hydroxide, and the solution is allowed to stand at room temperature for a period of about 10 minutes. The solution is then acidified with acetic acid, the benzene is evaporated in vacuo, and the residual material is recrystallized from ethyl acetate to give substantially pure 9α-fluoro-3,20-diketo-11β,17α-21-trihydroxy-allopregnane.

Various changes and modifications may be made in carrying out the present invention without departing from the spirit and scope thereof. Insofar as these changes and modifications are within the purview of the annexed claims they are to be considered as part of this invention.

I claim:

1. A compound selected from the group which consists of compounds having the following formula:

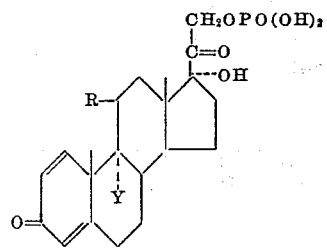

wherein R is a radical selected from the group consisting of keto and hydroxy radicals, and Y is a substituent selected from the group consisting of hydrogen and fluoro substituents, and alkali metal salts thereof.

2. Δ$^{1,4}$-3,11,20-triketo-17α,21-dihydroxy-pregnadiene 21-phosphate having the following formula:

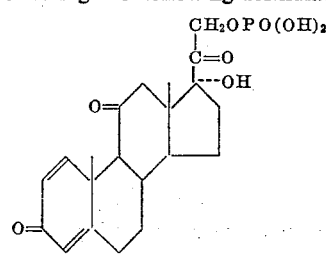

3. Δ$^{1,4}$-3,20-diketo-11β,17α,21-trihydroxy-pregnadiene 21-phosphate having the following formula:

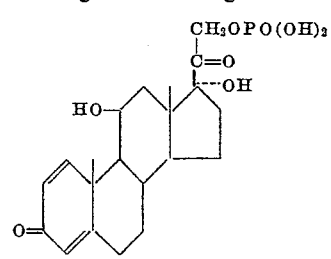

4. Δ$^{1,4}$-9α-fluoro-3,11,20-triketo-17α,21-dihydroxy-pregnadiene 21-phosphate having the following formula:

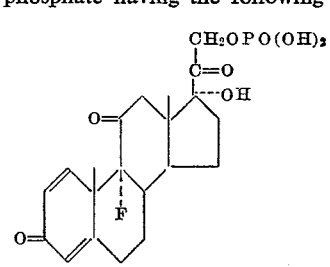

5. Δ$^{1,4}$-9α-fluoro-3,20-diketo-11β,17α,21-trihydroxy-pregnadiene 21-phosphate having the following formula:

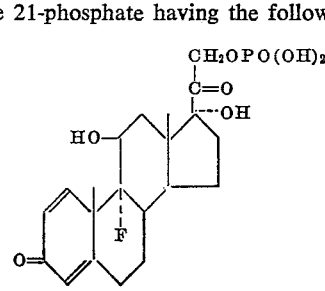

6. Alkali metal salts of $\Delta^{1,4}$-3,20-diketo-11β,17α,21-trihydroxy-pregnadiene 21-phosphate having the following formula:

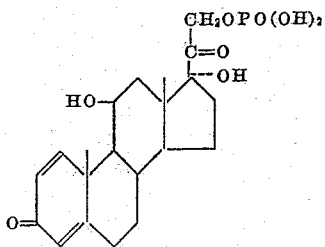

7. The process which comprises reacting a compound having the following formula:

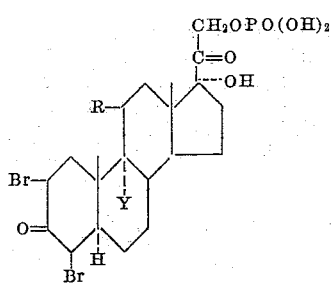

wherein R is a radical selected from the group consisting of keto and hydroxy radicals, and Y is a substituent selected from the group consisting of hydrogen and fluoro substituents, with a dehydrohalogenating agent to produce a compound having the formula:

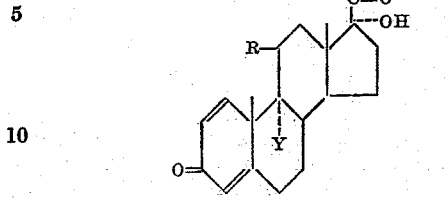

wherein R and Y have the significance above defined.

8. The process which comprises reacting 2,4-dibromo-3,11,20-triketo-17α,21-dihydroxy - allopregnane 21-phosphate with collidine to produce $\Delta^{1,4}$-3,11,20-triketo-17α,21-dihydroxy-pregnadiene 21-phosphate.

9. The process which comprises reacting 2,4-dibromo-3,20-diketo-11β,17α,21-trihydroxy - allopregnane 21-phosphate with collidine to produce $\Delta^{1,4}$-3,20-diketo-11β,17α,21-trihydroxy-pregnadiene 21-phosphate.

10. The process which comprises reacting 2,4-dibromo-9α-fluoro-3,11,20-triketo-17α,21-dihydroxy - allopregnane 21-phosphate with collidine to produce $\Delta^{1,4}$-9α-fluoro-3,11,20-triketo-17α,21-dihydroxy - pregnadiene 21-phosphate.

11. The process which comprises reacting 2,4-dibromo-9α-fluoro-3,20-diketo-11β,17α,21- trihydroxy-allopregnane 21-phosphate with collidine to produce $\Delta^{1,4}$-9α-fluoro-3,20-diketo-11β,17α,21-trihydroxy-pregnadiene 21-phosphate.

References Cited in the file of this patent
UNITED STATES PATENTS

| | | |
|---|---|---|
| 2,183,589 | Reichstein | Dec. 19, 1939 |
| 2,579,479 | Djerassi | Dec. 25, 1951 |